(12) United States Patent
Yang et al.

(10) Patent No.: US 9,128,327 B2
(45) Date of Patent: Sep. 8, 2015

(54) STRESS INSENSITIVE LIQUID CRYSTAL DISPLAY

(71) Applicant: Apple Inc., Cupertino, CA (US)

(72) Inventors: Young Cheol Yang, Sunnyvale, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 13/891,021

(22) Filed: May 9, 2013

(65) Prior Publication Data

US 2014/0078450 A1    Mar. 20, 2014

Related U.S. Application Data

(63) Continuation-in-part of application No. 13/622,973, filed on Sep. 19, 2012.

(51) Int. Cl.
| | | |
|---|---|---|
| *G02F 1/13363* | (2006.01) | |
| *G02F 1/1335* | (2006.01) | |
| *G02F 1/1333* | (2006.01) | |

(52) U.S. Cl.
CPC ...... *G02F 1/13363* (2013.01); *G02F 1/133371* (2013.01); *G02F 1/133528* (2013.01); *G02F 2001/133565* (2013.01); *G02F 2001/133638* (2013.01)

(58) Field of Classification Search
CPC ............................................... G02F 1/133371
USPC ........................................................ 349/107
See application file for complete search history.

(56) References Cited

U.S. PATENT DOCUMENTS

| | | |
|---|---|---|
| 5,150,235 A | 9/1992 | Haim et al. |
| 6,169,590 B1 | 1/2001 | Abileah et al. |
| 7,294,373 B2 | 11/2007 | Tsuboi et al. |
| 7,705,923 B2 | 4/2010 | Jeong et al. |
| 7,804,559 B2 | 9/2010 | Egi et al. |
| 8,049,850 B2 | 11/2011 | Sugiyama et al. |
| 2004/0105059 A1 | 6/2004 | Ohyama et al. |
| 2005/0140839 A1 | 6/2005 | Ki Hong |
| 2009/0207349 A1 | 8/2009 | Yoshimi et al. |
| 2009/0231519 A1 | 9/2009 | Toyama et al. |

(Continued)

FOREIGN PATENT DOCUMENTS

| | | |
|---|---|---|
| EP | 0952478 | 10/1999 |
| EP | 2077463 | 7/2009 |
| JP | Hei06-180445 | 6/1994 |
| KR | 10-2004-0044161 | 5/2004 |

(Continued)

*Primary Examiner* — Dennis Y Kim
(74) *Attorney, Agent, or Firm* — Treyz Law Group; G. Victor Treyz; Kendall P. Woodruff

(57) ABSTRACT

A display is provided that has upper and lower polarizers, a color filter layer, a liquid crystal layer, and a thin-film transistor layer. The color filter layer and thin-film transistor layer may be formed from materials such as glass that are subject to stress-induced birefringence. To reduce light leakage that reduces display performance, one or more internal layers may be incorporated into the display to help ensure that linearly polarized backlight that passes through the display is not undesirably converted into elliptically polarized light. The internal layers may include a thin-film polarizer layer that forms a coating on the color filter layer, a thin-film polarizer layer that forms a coating on the thin-film-transistor layer, a retarder layer that is formed as a coating on the color filter layer, and a retarder layer that is formed as a coating on the thin-film-transistor layer.

13 Claims, 20 Drawing Sheets

(56) References Cited

U.S. PATENT DOCUMENTS

2009/0310069 A1* 12/2009 Do et al. .................. 349/107
2010/0157212 A1* 6/2010 Sato et al. ................ 349/107
2011/0285640 A1 11/2011 Park et al.

FOREIGN PATENT DOCUMENTS

| KR | 10-2009-0014271 | 2/2009 |
| KR | 10-2011-0061170 | 6/2011 |
| TW | 200827840 | 7/2007 |

* cited by examiner

| I | II | III | IV | V | VI | VII | VIII | IX |
|---|---|---|---|---|---|---|---|---|
| | d | Liquid crystal Δn | Liquid crystal Δnd (nm) | in-cell retarder thickness (μm) | in-cell retarder Δn | in-cell retarder Δnd (nm) | Δn·d Total Retardation (nm) | Δnd/λ |
| wavelength/ nm | Liquid crystal cell gap (μm) | | | | | | | |
| 450 | 3.2 | 0.1159 | 370.9 | 0.7 | 0.120 | 79.0 | 449.8 | 1.0 |
| 530 | 3.2 | 0.1065 | 340.8 | 1.7 | 0.110 | 189.0 | 529.8 | 1.0 |
| 650 | 3.2 | 0.1005 | 321.6 | 3.3 | 0.100 | 328.2 | 649.8 | 1.0 |

FIG. 17

| I | II | III | IV | V | VI | VII | VIII | IX |
|---|---|---|---|---|---|---|---|---|
| wavelength/ nm | d Liquid crystal cell gap (μm) | Liquid crystal Δn | Liquid crystal Δn·d (nm) | in-cell retarder thickness (μm) | in-cell retarder Δn | in-cell retarder Δnd (nm) | Δn·d Total Retardation (nm) | Δnd/λ |
| 450 | 2.9 | 0.1159 | 336.1 | 0.9 | 0.120 | 113.7 | 449.8 | 1.0 |
| 530 | 3.2 | 0.1065 | 340.8 | 1.7 | 0.110 | 189.0 | 529.8 | 1.0 |
| 650 | 3.4 | 0.1005 | 341.7 | 3.1 | 0.100 | 308.1 | 649.8 | 1.0 |

FIG. 20

| I | II | III | IV | V | VI | VII | VIII | IX |
|---|---|---|---|---|---|---|---|---|
| wavelength/ nm | d Liquid crystal cell gap (µm) | Liquid crystal Δn | Liquid crystal Δnd (nm) | in-cell retarder thickness (µm) | in-cell retarder Δn | in-cell retarder Δnd (nm) | Δn·d Total Retardation (nm) | Δnd/λ |
| 450 | 2.9 | 0.1159 | 336.1 | 1.3 | 0.120 | 158.9 | 495.0 | 1.1 |
| 530 | 3.2 | 0.1065 | 340.8 | 1.7 | 0.110 | 189.0 | 529.8 | 1.0 |
| 650 | 3.4 | 0.1005 | 341.7 | 2.4 | 0.100 | 243.3 | 585.0 | 0.9 |

FIG. 21

| I | II | III | IV | V | VI | VII | VIII | IX |
|---|---|---|---|---|---|---|---|---|
| wavelength nm | Liquid crystal cell gap (μm) | Liquid crystal Δn | Liquid crystal Δnd (nm) | in-cell retarder thickness (μm) | in-cell retarder Δn | in-cell retarder Δnd (nm) | Δn·d Total Retardation (nm) | Δnd/λ |
| 450 | 3.2 | 0.1159 | 370.9 | 3.3 | 0.024 | 79.0 | 449.8 | 1.0 |
| 530 | 3.2 | 0.1065 | 340.8 | 3.3 | 0.057 | 189.0 | 529.8 | 1.0 |
| 650 | 3.2 | 0.1005 | 320.6 | 3.3 | 0.100 | 328.2 | 649.8 | 1.0 |

FIG. 24

STRESS INSENSITIVE LIQUID CRYSTAL DISPLAY

This application is a continuation-in-part of patent application Ser. No. 13/622,973, filed Sep. 19, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. In some mounting configurations, standoffs, housing walls, display bezels and other structures may press against a display, leading to bending. If care is not taken, optical effects such as stress-induced birefringence may cause a display to exhibit undesired light leakage.

It would therefore be desirable to be able to provide improved displays for electronic devices.

SUMMARY

An electronic device may be provided with a display. The display may have upper and lower polarizers. A color filter layer, a liquid crystal layer, and a thin-film transistor layer may be interposed between the upper and lower polarizers. A backlight unit may provide backlight that passes through the layers of the display.

The color filter layer and thin-film transistor layer may be formed from materials such as glass that are subject to stress-induced birefringence when the display is mounted in a housing for the electronic device. Light leakage may be reduced by incorporating one or more internal layers into the display to help ensure that linearly polarized backlight that passes through the display is not undesirably converted into elliptically polarized light.

The internal layers of the display may include a thin-film polarizer layer that forms a coating on the color filter layer and/or a thin-film polarizer layer that forms a coating on the thin-film-transistor layer. If desired, the internal layers may include a retarder layer (waveplate) that is formed as a coating on the color filter layer or thin-film-transistor layer. The retarder layer may be configured to counteract polarization state changes that are produced by backlight traveling through the liquid crystal layer.

The retarder layer and liquid crystal layer may be provided with different thicknesses and the retarder layer may be configured to exhibit different birefringence values in display pixels of different colors to counteract wavelength-dependent birefringence in the liquid crystal layer.

Further features of the invention, its nature and various advantages will be more apparent from the accompanying drawings and the following detailed description of the preferred embodiments.

BRIEF DESCRIPTION OF THE DRAWINGS

FIG. 17 is a table showing illustrative thicknesses and properties that may be associated with the structures of FIG. 14 in accordance with an embodiment of the present invention.

FIG. 20 is a table showing illustrative thicknesses and properties that may be associated with the structures in a display with different liquid crystal thicknesses and different retarder thicknesses for different respective display pixel colors in accordance with an embodiment of the present invention.

FIG. 21 is a table showing illustrative thicknesses and properties that may be associated with the structures in a display with different liquid crystal thicknesses and different retarder thicknesses for different respective display pixel colors in which limits have been placed on retarder thickness variations in accordance with an embodiment of the present invention.

FIG. 24 is a table showing illustrative properties that may be associated with a structure of the type shown in FIG. 22 in accordance with an embodiment of the present invention.

DETAILED DESCRIPTION

Electronic devices may include displays. The displays may be used to display images to a user. Illustrative electronic devices that may be provided with displays are shown in FIGS. 1, 2, and 3.

Figure 1:
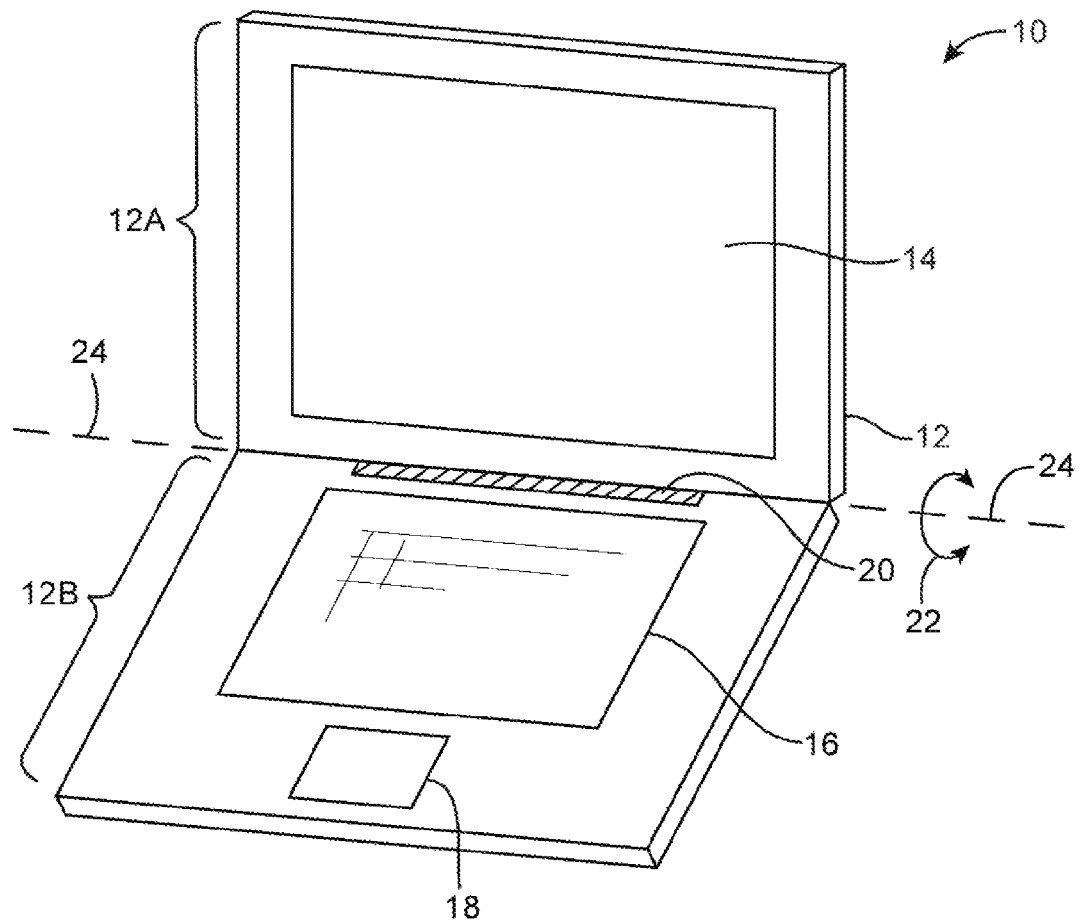
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
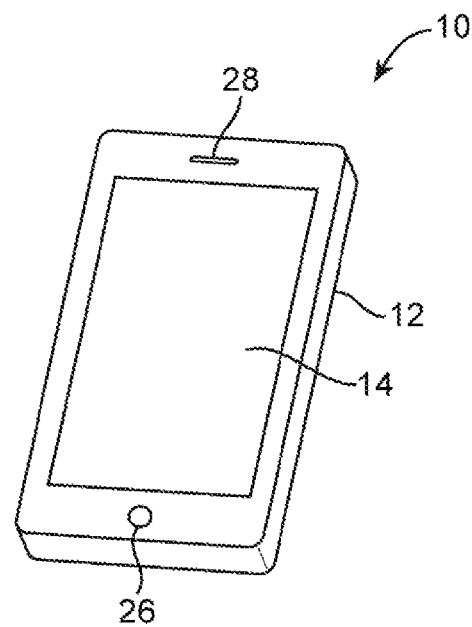
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
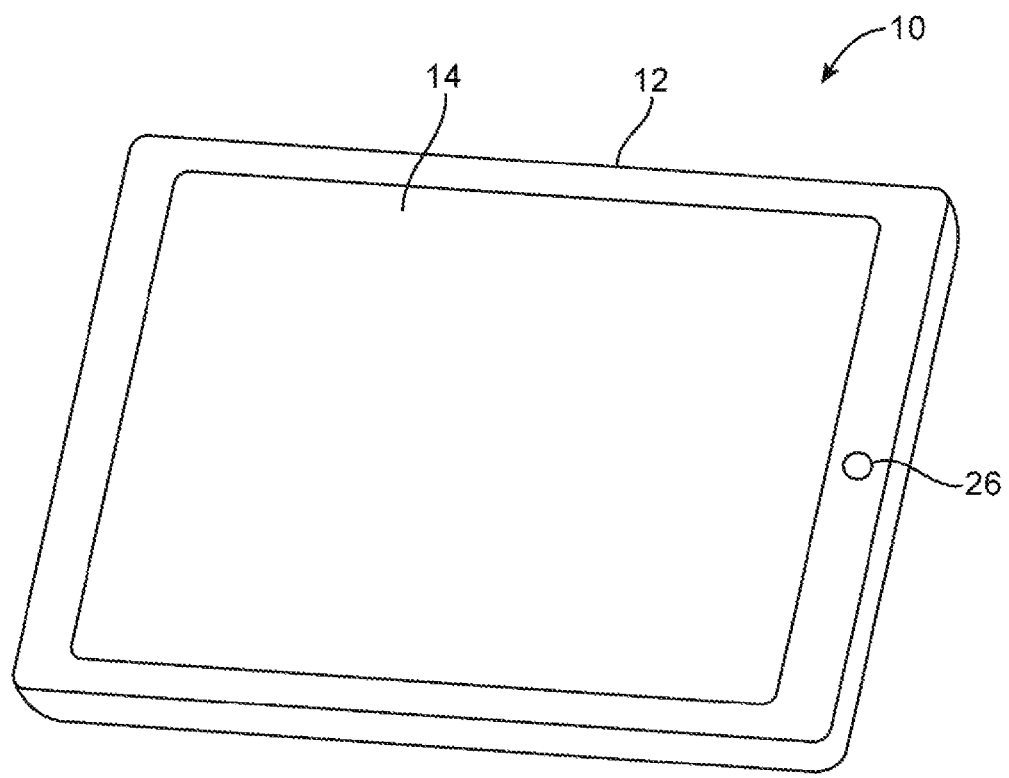
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
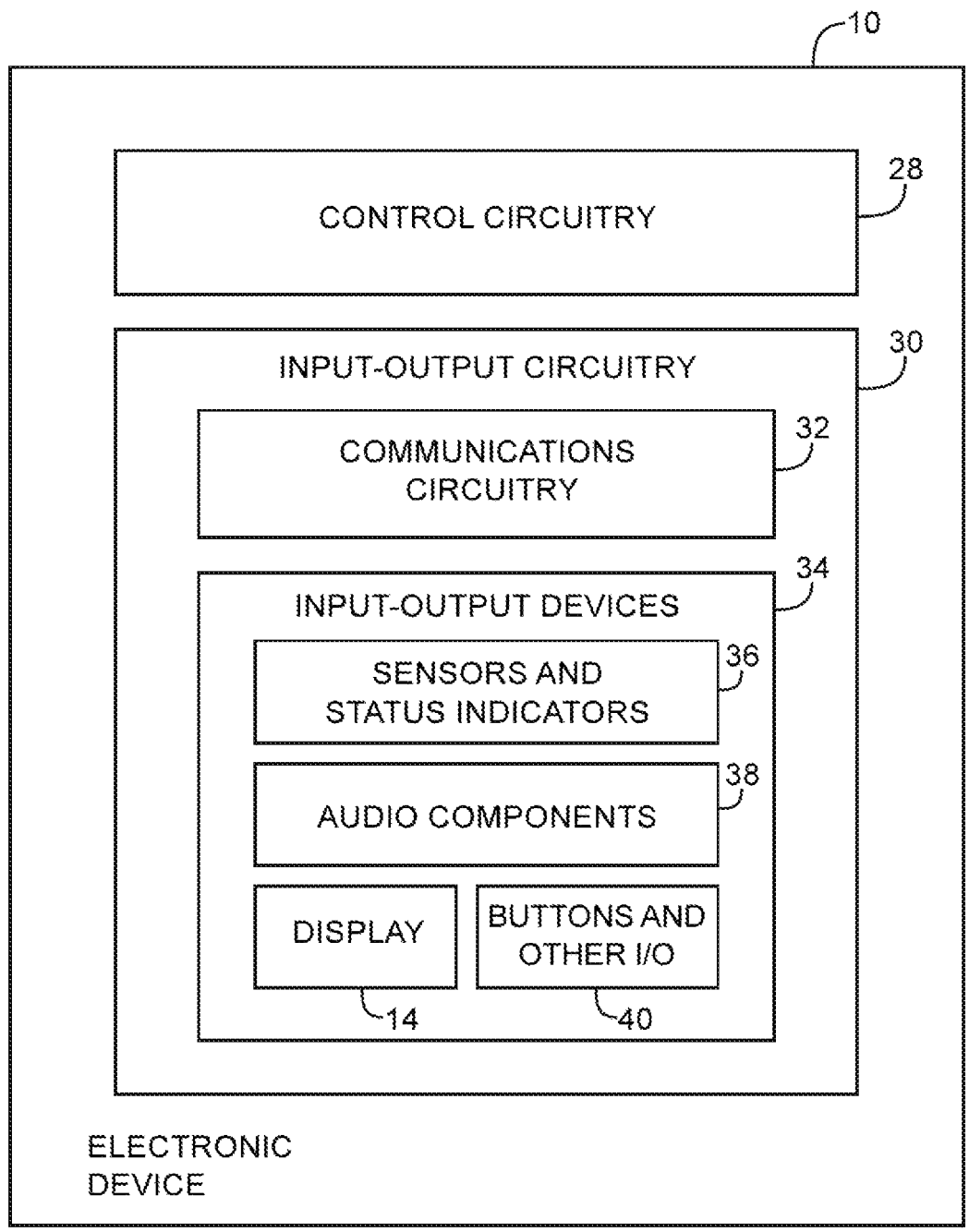
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 28. Control circuitry 28 may include storage and processing circuitry for controlling the operation of device 10. Control circuitry 28 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 28 may include processing circuitry based on one or more microprocessors, microcontrollers, digital signal processors, baseband processors, power management units, audio codec chips, application specific integrated circuits, etc.

Control circuitry 28 may be used to run software on device 10, such as operating system software and application software. Using this software, control circuitry 28 may present information to a user of electronic device 10 on display 14. When presenting information to a user on display 14, sensor signals and other information may be used by control circuitry 28 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
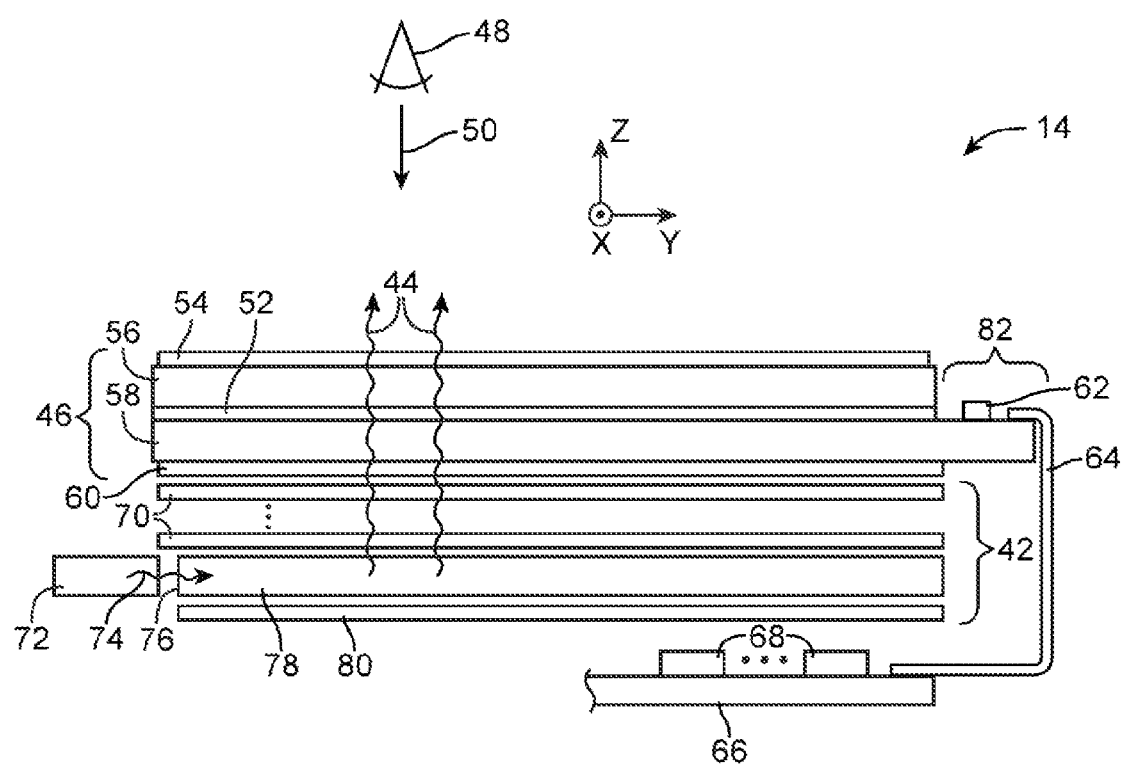
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 28 (e.g., one or more integrated circuits such as components 68 on printed circuit 66 of FIG. 5) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

When display 14 is mounted in a housing, the layers of display 14 such as thin-film transistor layer 58 and color filter layer 56 (e.g., the glass layers of the display) may be subjected to stresses. Stress may be imparted by bending the layers of display 14 when display 14 is mounted within housing 12 (e.g., using standoffs, housing walls, internal frame structures, display bezels, adhesive, and other mounting and support structures). The optical behavior of the layers of display 14 when bent depends on the type of materials used in forming the display layers.

Figure 6:
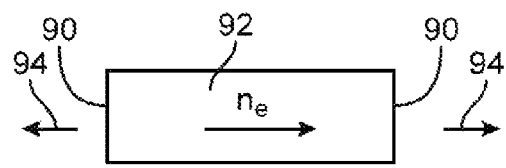
FIG. 6 is a cross-sectional side view of a display layer such as a layer of glass in a thin-film-transistor layer or color filter layer showing how stress-induced birefringence may be generated upon application of tensile stress to the layer of glass.

As shown in FIG. 6, when a glass layer such as glass layer 92 is subjected to tensile stress by pulling ends 90 of glass layer 92 in opposing outward directions 94, the glass layer may exhibit birefringence so that the optical axis (extraordinary axis) of the glass runs parallel to the direction of stress (i.e., horizontally within the page in the orientation of FIG. 6). The ordinary axis of the glass layer may run perpendicular to the optical axis in the plane of glass layer 92.

Figure 7:
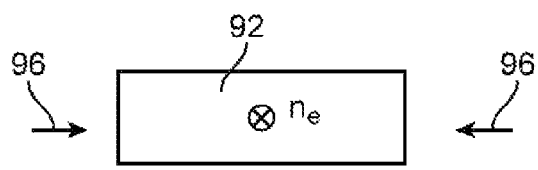
FIG. 7 is a cross-sectional side view of a display layer such as a layer of glass in a thin-film-transistor layer of color filter layer showing how stress-induced birefringence may be generated upon application of compressive stress to the layer of glass.

As shown in FIG. 7, when a glass layer such as glass layer 92 is subjected to compressive stress by pushing ends 90 of glass layer 92 in opposing inward directions 96, the glass layer may exhibit birefringence so that the optical axis (extraordinary axis) of the glass runs parallel to the direction of stress (i.e., into the page in the orientation of FIG. 6). The ordinary axis may run perpendicular to the extraordinary axis in the plane of layer 92.

Figure 8:
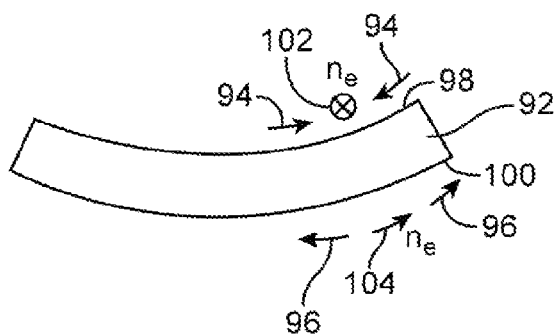
FIG. 8 is a cross-sectional side view of a layer of material such as a layer of glass that has been subjected to bending and that exhibits stress-induced birefringence in a display.

A bent layer of glass such as glass layer 92 of FIG. 8 may exhibit compressive stress along top surface 98 (e.g., near the edge of glass layer 92) and may exhibit tensile stress along lower surface 100. As a result, glass layer 92 may be characterized by an optical axis such as optical axis 102 that extends into the page of FIG. 8 along upper surface 98 and an optical axis such as optical axis 104 that extends parallel to the page of FIG. 8 along lower surface 100.

Figure 9:
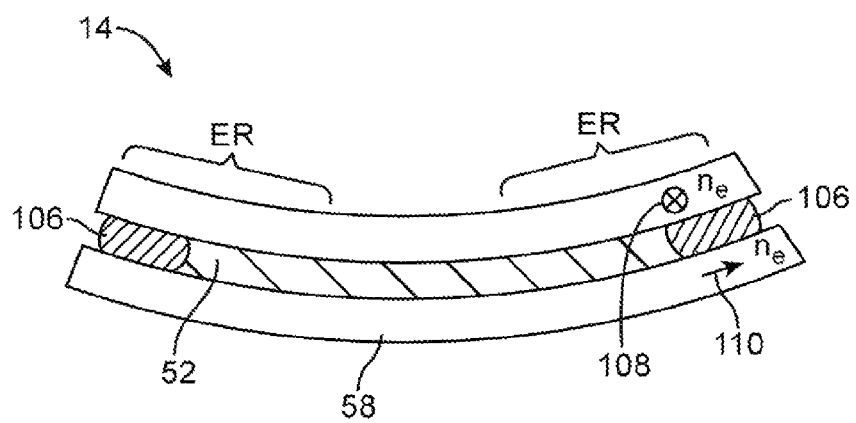
FIG. 9 is a cross-sectional side view of a display with layers of glass that have been subjected to bending due to forces imparted by mounting the display in a device housing in accordance with an embodiment of the present invention.

As shown in FIG. 9, when the layers of display 14 such as color filter layer 56 and thin-film-transistor layer 58 are mounted in device housing 12, these layers may become bent (e.g., from forces introduced when mounting display 14 in housing 12). The bending of layers 56 and 58 may give rise to stress-induced birefringence. If care is not taken, this birefringence can adversely affect the performance of a display by causing light leakage when the display is viewed by a user.

Layers 56 and 58 may be glass layers or layers of other material with optical characteristics of the type described in connection with FIGS. 6, 7, and 8. A layer of sealant such as sealant 106 (e.g., a bead of adhesive) may be interposed between color filter layer 56 and thin-film-transistor layer 58. Sealant 106 may run around the periphery of display 14 in a rectangular ring and may surround and enclose liquid crystal material 52. The presence of sealant 106 may cause the tensile stress on the lower surface of layer 56 to counteract the compressive stress on the upper surface of layer 58. This compensation of stresses may cause optical axis 108 of layer 56 near the edge of layer 56 (e.g., in edge region ER) to point into the page of FIG. 9 and may cause optical axis 110 of layer 58 near the edge of layer 58 (e.g., in edge region ER) to lie in the plane of layer 58 (lying within the page and pointing to the right in the example of FIG. 9). The perpendicular optical axes of layers 58 and 56 (particularly prevalent in edge regions ER) may lead to changes in the polarization state of backlight passing through these layers that cause light leakage in conventional displays.

Figure 10A:
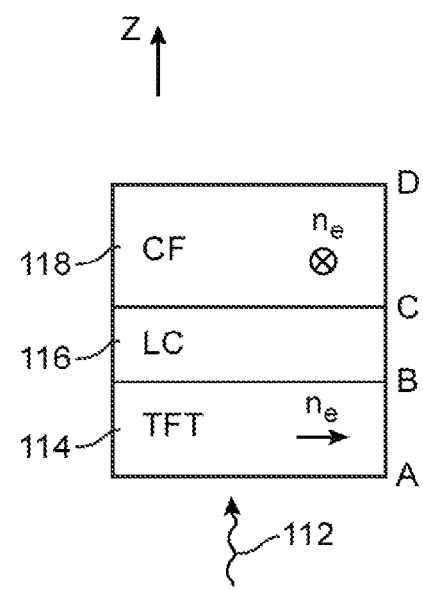
FIG. 10A is a cross-sectional diagram of display layers in a conventional liquid crystal display.

FIG. 10A is a cross-sectional side view of a conventional display having glass layers that may be subject to stress-induced birefringence. As shown in FIG. 10, the display of FIG. 10A is a liquid crystal display in which liquid crystal layer 116 is sandwiched between thin-film-transistor layer 114 and color filter layer 118. The display has upper and lower polarizers located respectively above and below the layers of FIG. 10. A backlight may generate backlight 112 that travels vertically upwards through the display in direction Z. Upon passing through the lower polarizer (i.e., at point A of FIG. 10), backlight 112 may be linearly polarized (i.e., the lower polarizer may impart a linear polarization on backlight 112). The polarization of light 112 may then be affected by passing from point A to point B through thin-film-transistor layer 114 (which is exhibiting stress-induced birefringence), by passing from point B to point C through liquid crystal 116 (which is birefringent), and by passing from point C to point D through color filter layer 118 (which is exhibiting stress-induced birefringence). The upper and lower polarizers in the display do not typically exhibit stress-induced birefringence and are not shown in FIG. 10A.

Figure 10B:
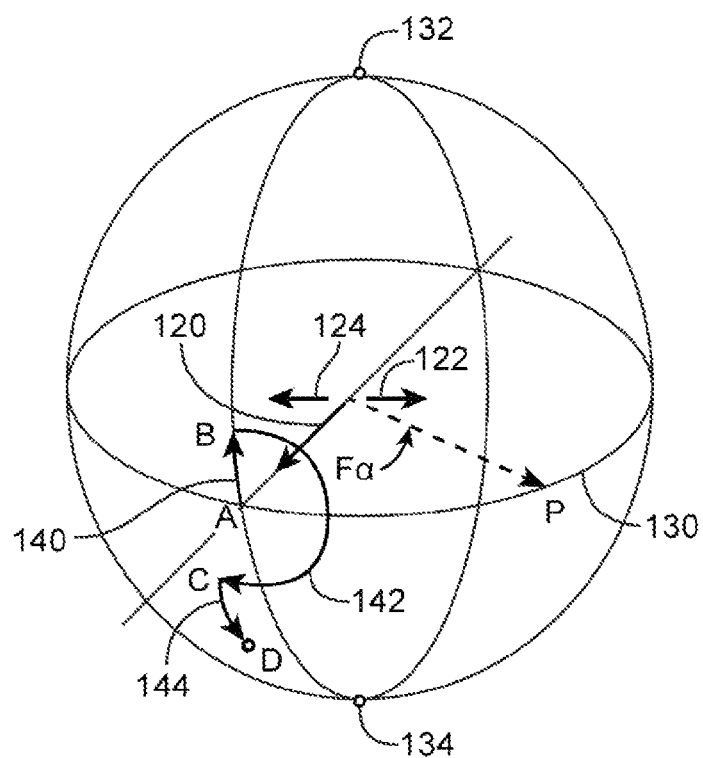
FIG. 10B is a Poincare sphere showing how the polarization of backlight may vary when passing through the conventional display layers of FIG. 9A when the layers are subject to stress-induced birefringence.

The polarization state of backlight 112 as backlight 112 travels through the layers of the conventional display of FIG. 10A is illustrated in the Poincare sphere of FIG. 10B. In a Poincare sphere, linear polarization states are represented by points on equatorial line 130. Point 132 represents right-hand circularly polarized light. Point 134 represents left-hand circularly polarized light. Intermediate points on the Poincare sphere represent various types of elliptically polarized light.

Each of the layers of FIG. 10A and 10B has an optical axis that is aligned in a different direction. In the Poincare sphere representation of FIG. 10B, thin-film transistor layer 114 is characterized by optical axis 122, color filter layer 118 is characterized by optical axis 124, and liquid crystal layer 116 is characterized by optical axis 120. On the Poincare sphere, azimuthal angle α of a vector each point P on equatorial line 130 is equal to 2θ, where θ is equal to an actual physical angle (e.g., an azimuthal angle in real space that is associated with the orientation of an optical axis for a display layer or an angle associated with the polarization of light such as light 112 that is passing through the display). As a result, a pair of axes such as thin-film-transistor axis 122 and liquid crystal layer axis 120 that appear to be perpendicular to each other in the Poincare sphere representation of FIG. 10B are, within the real-life coordinate system of the display, oriented at a 45° angle with respect to each other. Similarly, a pair of axes such as thin-film-transistor axis 122 and color filter layer axis 124 that appear to be separated by 180° in the Poincare sphere representation of FIG. 10B are, within the real-life coordinate system of the display, oriented at a 90° angle with respect to each other (i.e., axis 124 is perpendicular to axis 122).

The behavior of the polarization of light 112 is affected by the orientation of each optical axis and the thickness of each layer in the display of FIG. 10A. As shown in FIG. 10B, light 112 is initially linearly polarized (point A). Following passage through layer 114, the polarization of light 112 is represented by point B on the Poincare sphere of FIG. 10B (i.e., light 112 is transformed from linearly polarized light to elliptically polarized light due to the stress-induced birefringence of layer 114). Visually, the transition from point A to point B along line 140 on the surface of the Poincare sphere is associated with rotation of point A about thin-film-transistor layer optical axis 122 on the surface of the sphere. Following passage of light 112 through layer 114, light 112 passes through liquid crystal layer 116. Layer 116 causes the polarization of light 112 to move from point B to point C along line 142 on the Poincare sphere of FIG. 10B (rotating about liquid crystal layer optical axis 120).

After traveling through liquid crystal layer 116, light 112 passes through layer 118. The birefringence of layer 118 causes the polarization of light 112 to change from the polarization state represented by point C to the polarization state represented by point D along line 144 of the Poincare sphere of FIG. 10B (rotating about color filter layer optical axis 124).

If liquid crystal layer 116 had not been present, the polarization state changes associated with lines 144 and 140 would have canceled each other out, resulting in minimal changes to the linear polarization of light 112 (i.e., light 112 would have remain linearly polarized with a polarization state represented by point A and the display would have operated satisfactorily). Because of the presence of liquid crystal layer 116 and the associated transition of the polarization state of light 112 from point B to point C, however, light 112 at point D (i.e., light 112 exiting the upper surface of color filter layer 118 of FIG. 10A) is substantially elliptically polarized, rather than being linearly polarized as desired. When this elliptically polarized light passes through the upper polarizer, the fact that the light is not linearly polarized as expected allows some of the light to leak out from the upper surface of the display through the upper polarizer, even when the electric field being applied to liquid crystal layer 116 is attempting to display a black display pixel. Display performance in conventional displays is therefore limited by the inability of conventional displays to satisfactorily display black images in the presence of stress-induced birefringence in the layers of the display.

Illustrative display configurations with designs that address the shortcomings of conventional displays in handling stress-induced birefringence are shown in FIGS. 11, 12, and 13.

Figure 11B:
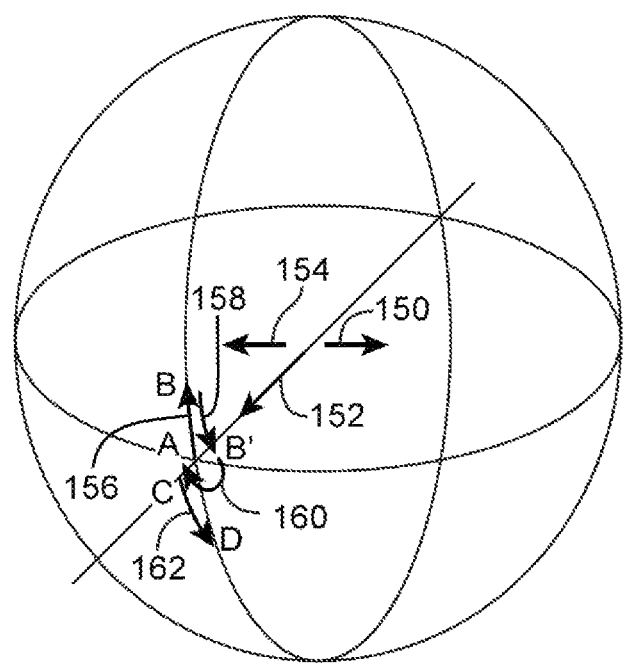
FIG. 11B is a Poincare sphere showing how the polarization of backlight may vary when passing through the display layers of FIG. 11A in the presence of stress-induced birefringence in some of the layers in accordance with an embodiment of the present invention.
Figure 11A:
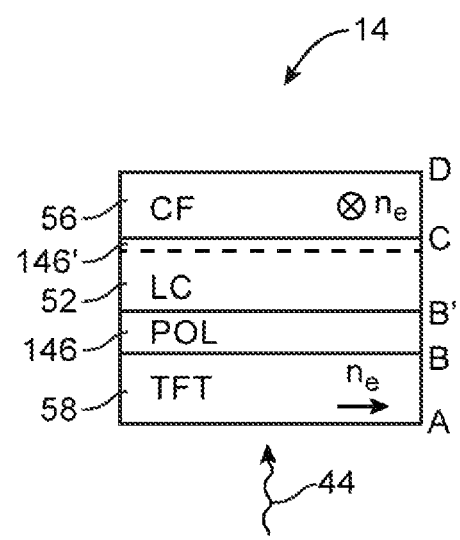
FIG. 11A is a cross-sectional diagram of display layers in a liquid crystal display with one or more internal polarization layers to help reduce light leakage due to stress-induced birefringence in accordance with an embodiment of the present invention.

As shown in the example of FIG. 11A, display 14 may be provided with one or more internal polarizer layers such as layer 146 and/or layer 146'. The layers of display 14 that are shown in FIG. 11A may be sandwiched between upper and lower polarizers (not shown in FIG. 11A) such as upper polarizer 54 and lower polarizer 60. Layers such as layers 146 and/or layer 146' may be implemented as thin-film coatings on glass substrates. For example, internal polarizer 146 may be formed as a thin-film coating on the upper surface of thin-film-transistor layer 58 and internal polarizer 146' may be formed as a thin-film coating on the lower surface of color filter layer 56. Examples of thin-film polarizer coatings that may be used for forming polarizers such as polarizers 146 and 146' of FIG. 11A include polymers containing optically anisotropic dyes that are characterized by different absorption coefficients in different lateral dimensions within the plane of display 14. The thickness of the thin-film coatings used in forming the internal polarizer(s) for display 14 may be, for example, less than 10 microns, less than 3 microns, less than 2 microns, or less than 1 micron.

The behavior of the polarization of display backlight such as light 44 is affected by the orientation of each optical axis and the thickness of each layer in display 14. Optical axis 150 of FIG. 11B may be associated with thin-film-transistor layer 58, which may exhibit stress-induced birefringence. Optical axis 152 of FIG. 11B may be associated with the liquid crystal layer 52. Optical axis 154 of FIG. 11B may be associated with polarizer layer 146 and may be associated with color filter layer 56, which may exhibit stress-induced birefringence.

As shown in FIG. 11B, light 112 is initially linearly polarized (point A). Following passage through thin-film-transistor layer 58, the polarization of light 44 may be represented by point B on the Poincare sphere of FIG. 11B (i.e., light 44 may be transformed from linearly polarized light to elliptically polarized light due to the stress-induced birefringence of layer 58). The transition from point A to point B along line 156 on the surface of the Poincare sphere of FIG. 11B is associated with rotation about thin-film-transistor layer optical axis 150. Following passage of light 44 through layer 58, light 44 may pass through polarizer layer 146 to point B'. The transition of the polarization state of light 44 when traveling from point B to B' through polarizer layer 146 of FIG. 11A is represented by the transition from elliptically polarized polarization state B to linearly polarized polarization state B' in FIG. 11B along line 158.

Due to the presence of linear polarizer layer 146, light 44 in polarization state B' is characterized by linear polarization. As a result, light 44 will be less elliptically polarized (more linearly polarized) upon passing through layers 52 and 56 than in conventional display arrangements. As shown in FIG. 11B, the transition of the polarization state of light 44 when traveling from point B' to point C through liquid crystal layer 52 of FIG. 11A may be represented by line 160 and the transition of the polarization state of light 44 when traveling from point C to point D through color filter layer 56 may be represented by line 162. Although light 44 is elliptically polarized at point D, light 44 at point D is more linearly polarized than conventional light D of FIGS. 10A and 10B, thereby reducing light leakage and improving the performance of display 14.

If desired, lower internal polarizer 146 may be supplemented by adding an upper internal polarizer such as polarizer 146' of FIG. 11A. Upper polarizer 146' may also be used alone (e.g., instead of lower internal polarizer 146). Whether polarizer layer 146 is used alone, polarizer 146' is used alone, or polarizers 146 and 146' are used together, the presence of internal polarizer material adjacent to liquid crystal layer 52 may help remove the birefringence effects of the glass layers in display 14 such as layer 58, thereby reducing the ellipticity of the polarized light exiting layer 56 and improving display performance.

Figure 12B:
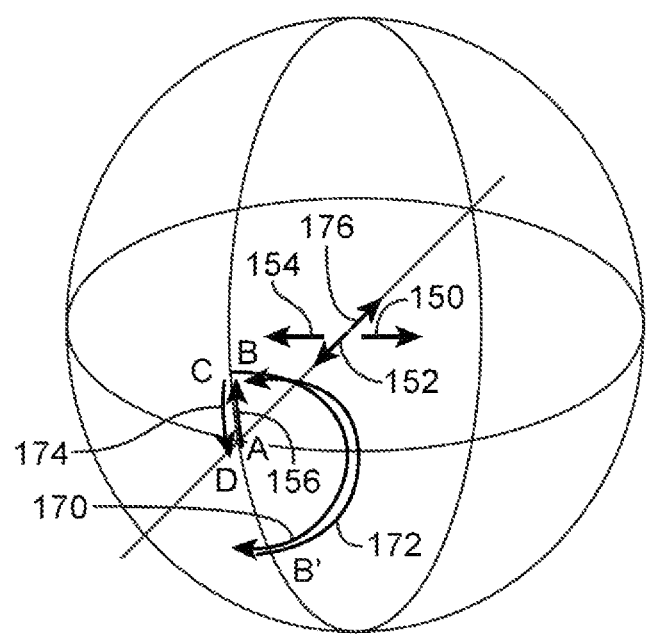
FIG. 12B is a Poincare sphere showing how the polarization of backlight may vary when passing through the display layers of FIG. 12A in the presence of stress-induced birefringence in some of the layers in accordance with an embodiment of the present invention.
Figure 12A:
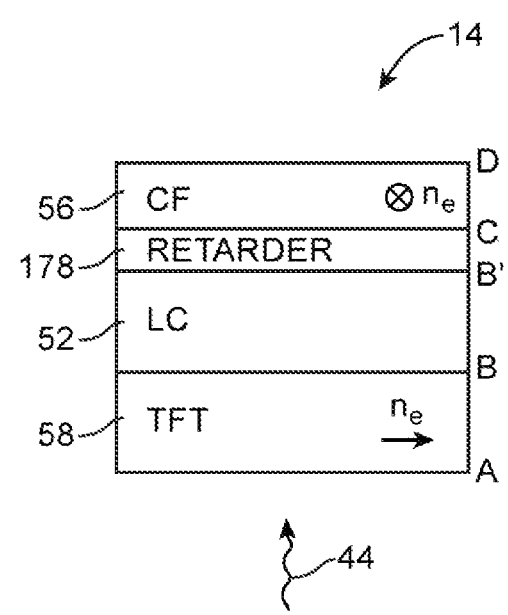
FIG. 12A is a cross-sectional diagram of display layers in a liquid crystal display with an internal retarder formed as a coating on an inner (lower) surface of a color filter layer in accordance with an embodiment of the present invention.

FIG. 12A is a diagram of another illustrative configuration that may be used for the middle layers of display 14 between upper polarizer 54 and lower polarizer 60. As shown in the example of FIG. 12A, display 14 may be provided with an internal retarder layer such as retarder layer 178 (sometimes referred to as a wave plate, birefringent layer, or birefringent coating). The polarization change that is imposed on light 44 by retarder 178 may be configured to be equal and opposite to that of liquid crystal layer 52 (as an example). Internal retarder layers such as retarder layer 178 may be implemented as a coating on the lower surface of color filter layer 56 (e.g., a thin-film coating of a liquid crystal polymer or other birefringent material). The thickness of the thin-film coating used in forming an internal retarder such as retarder 178 for display 14 may be, for example, less than 10 microns, less than 3 microns, less than 2 microns, or less than 1 micron.

The behavior of the polarization of display backlight such as light 44 is affected by the orientation of each optical axis and the thickness of each layer in display 14. Optical axis 150 of FIG. 12B may represent the optical axis of thin-film-transistor layer 58, which may exhibit stress-induced birefringence. Optical axis 152 of FIG. 12B may be associated with liquid crystal layer 52. Optical axis 154 of FIG. 12B may represent the optical axis of color filter layer 56, which may exhibit stress-induced birefringence. Optical axis 176 of FIG. 12B may be associated with retarder 178 (i.e., retarder 178 may have an optical axis that is perpendicular to the optical axis of liquid crystal layer 52 when measured in degrees θ).

As shown in FIG. 12B, light 112 is initially linearly polarized (point A). Following passage through thin-film-transistor layer 58, the polarization of light 44 may be represented by point B on the Poincare sphere of FIG. 12B (i.e., light 44 may be transformed from linearly polarized light to elliptically polarized light due to the stress-induced birefringence of layer 58). The transition from point A to point B along line 156 on the surface of the Poincare sphere of FIG. 12B is associated with rotation about thin-film-transistor layer optical axis 150.

Following passage of light 44 through layer 58, light 44 may pass through liquid crystal layer 52 to point B'. The transition of the polarization state of light 44 when traveling from point B to B' through liquid crystal layer 52 of FIG. 12A is represented by the transition from elliptically polarized polarization state B to elliptically polarized polarization state B' in FIG. 12B along line 170.

Due to the presence of birefringent retarder 178, the polarization state of light 44 returns to state B as light passes through retarder 178 from point B' to C of FIG. 12A, effectively reversing the polarization transition associated with passing through liquid crystal layer 52. The transition of the polarization state of light 44 when traveling from point B' to C through retarder 178 is represented by the transition from elliptically polarized polarization state B' to elliptically polarized polarization state C. As shown in FIG. 12B, line 172, which is associated with rotation about retarder optical axis 176, which is perpendicular to optical axis 152 in e (i.e., in the layers of display 14), retraces (in reverse direction) the course of line 170, thereby counteracting and neutralizing the polarization state changes associated with passing backlight 44 through liquid crystal layer 52.

Following passage of light 44 through retarder 178, light 44 passes through color filter layer 56. As shown in FIG. 12B, the transition of the polarization state of light 44 when traveling from point C to point D through color filter layer 56 may be represented by line 174, which is associated with rotation about color filter optical axis 154. Because transition 172 brings the polarization state of light 44 back to point B from point B', transition 174 causes the polarization of light 44 to return to its original state (i.e., point D is associated with the same linearly polarized light state as original point A). As a result, display performance will not be degraded due to an elliptical light polarization state as light 44 exits the upper surface of color filter layer 56.

Figures 13A, 13B:
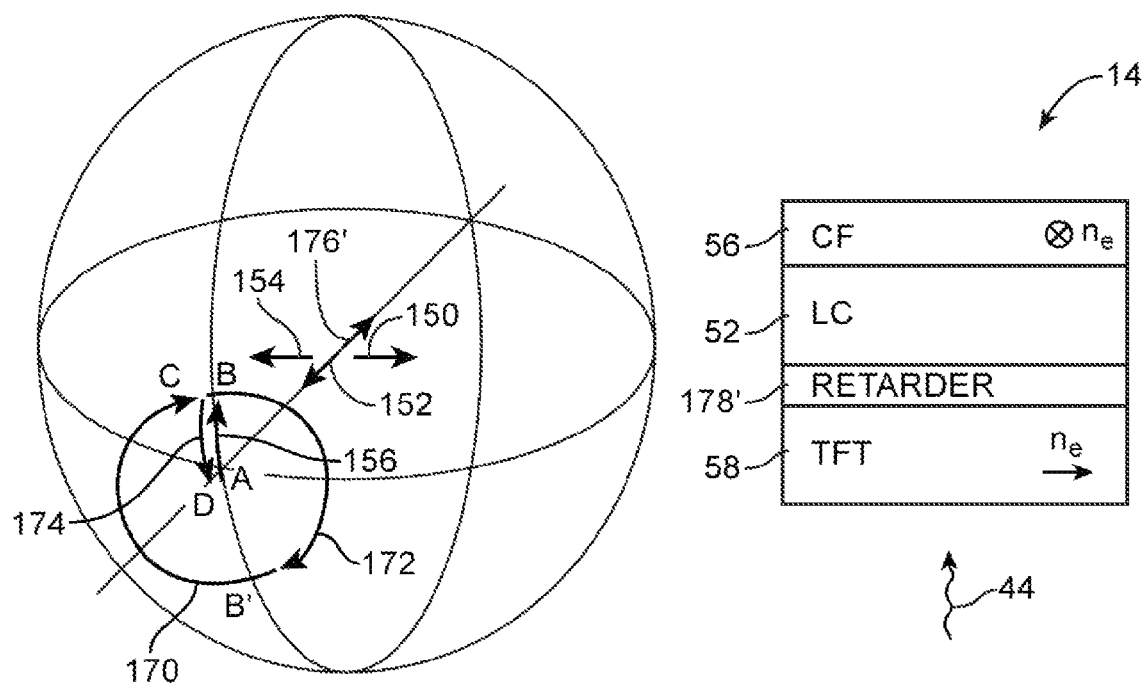
FIG. 13A is a cross-sectional diagram of display layers in a liquid crystal display with an internal retarder formed as a coating on an inner (upper) surface of a thin-film transistor layer in accordance with an embodiment of the present invention.
FIG. 13B is a Poincare sphere showing how the polarization of backlight may vary when passing through the display layers of FIG. 13A in the presence of stress-induced birefringence in some of the layers in accordance with an embodiment of the present invention.

In the illustrative configuration of FIG. 13A, the internal retarder (retarder 178') has been formed on the upper surface of thin-film-transistor layer 58, rather than the lower surface of color filter layer 56. With this type of arrangement, the polarization state transition from B' to C returns light 44 to the same polarization state (point C) as the arrangement of FIG. 12A, but does so by following transition line 172' of FIG. 13B (associated with rotation about optical axis 176' of retarder 178') rather than by following transition line 172 of FIG. 12B. In the configuration of FIG. 12A, the optical axis of retarder 178 is perpendicular to the optical axis of liquid crystal layer 52 (i.e., separated by α=180° and θ=90°). In the configuration of FIG. 13A, the optical axis of retarder 178' is parallel to the optical axis of liquid crystal layer 52.

The birefringence of liquid crystal layer 52 may be wavelength dependent (i.e., liquid crystal layer 52 may exhibit dispersion in its refractive index). As a result, there may be larger values of Δn (the index of refraction difference between the extraordinary axis index ne and the ordinary axis index no) at shorter wavelengths of light than at longer wavelengths of light. To ensure that the retarder in display 14 (and/or other structures in display 14) can adequately counteract light polarization state changes caused by passing the backlight through the liquid crystal layer in display pixels of all colors (red, green, and blue) in the display, the birefringent retarder layer structures and/or other structures such as liquid crystal layer structures in display 14 can be provided with different configurations for display pixels of different respective display pixel colors.

Figure 14:
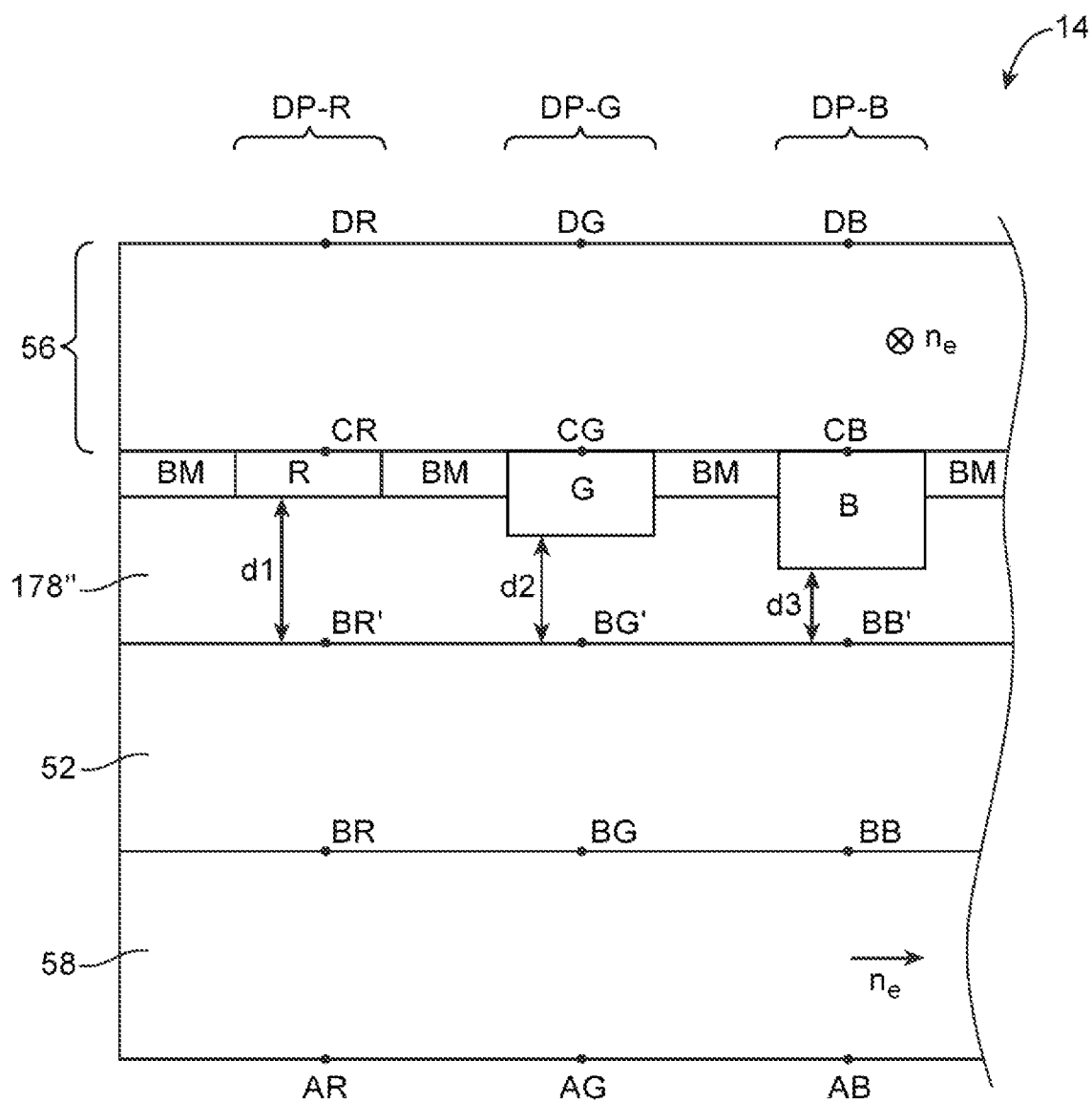
FIG. 14 is a cross-sectional diagram of display layers in a liquid crystal display with different birefringent retarder layer thicknesses for display pixels of different respective display pixel colors in accordance with an embodiment of the present invention.

Consider, as an example, illustrative display 14 of FIG. 14. As shown in FIG. 14, display 14 contains an array of display pixels of different colors such as red display pixels DP-R, green display pixel DP-G, and blue display pixel DP-B. Black matrix BM forms an opaque grid of rectangular openings. Color filter elements (e.g., colored polyimide) of different colors such as red element R, green element G, and blue element B are formed in the openings of the black matrix. Retarder 178" has different heights (thicknesses) for different respective display pixel colors. Red display pixel DP has relatively thin color filter element R, so retarder 178" has a relatively large thickness d1 for red display pixel DP-R. Green and blue filter elements have respective thicknesses that give rise to different respective thicknesses d2 and d3 of retarder 178" in green display pixel DP-G and blue display pixel DP-B. The different retarder thicknesses for the different colors of display pixels in display 14 help compensate for wavelength dependence in the birefringence of liquid crystal layer 52.

Figure 15:
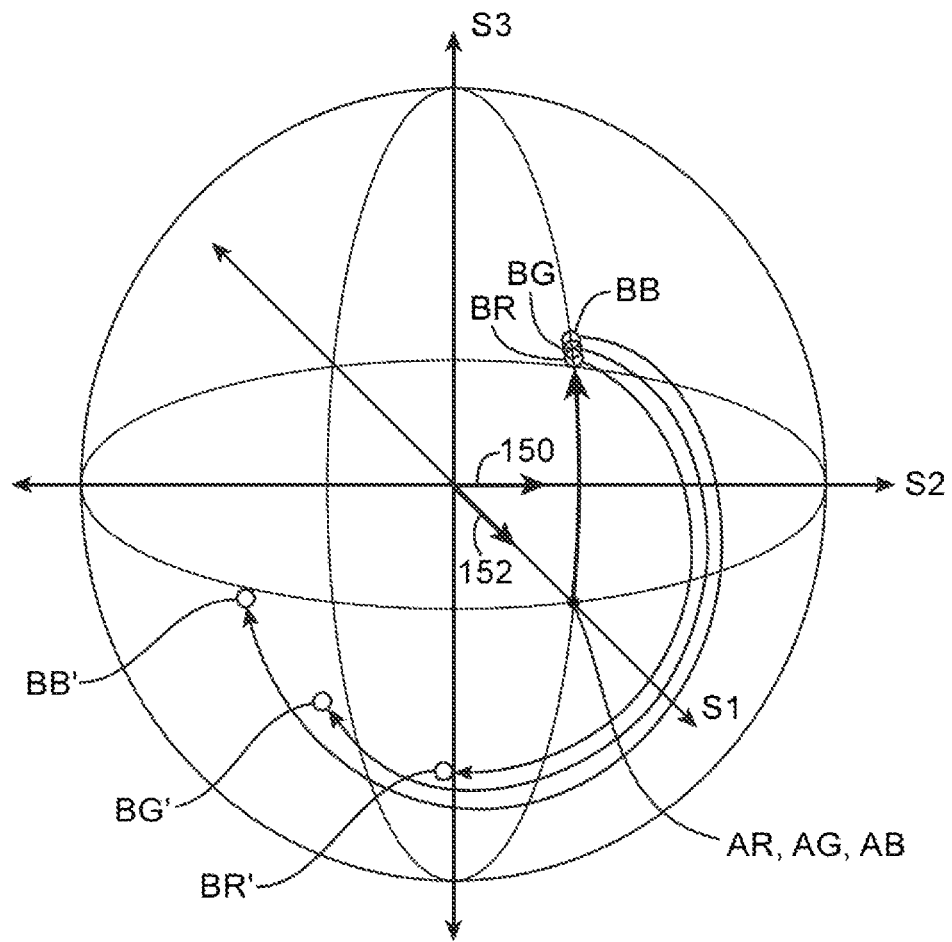
FIG. 15 is a Poincare sphere showing how the polarization of backlight may evolve when passing through the thin-film transistor layer and liquid crystal layer of the display layers of FIG. 14 in accordance with an embodiment of the present invention.

FIG. 15 is a Poincare sphere showing how the polarization of backlight may vary when passing through the thin-film transistor layer 58 and liquid crystal layer 52 of the display layers of FIG. 14. Initially, the polarization of red pixel light is at point AR, the polarization of green pixel light is at point AG, and the polarization of blue light is at point AB. Following passage of the light through layer 58 of FIG. 14 and the corresponding rotation about thin-film-transistor optical axis 150 in the sphere of FIG. 15, the polarization of red pixel light is represented by point BR, the polarization of green pixel light is represented by point BG, and the polarization of blue pixel light is represented by point BB. After the light passes through liquid crystal layer 52, which exhibits wavelength-dependent birefringence, the polarization states of the red, green, and blue pixels become different. As shown in FIG. 15, following rotation about liquid crystal optical axis 152, red pixel light is represented by point BR', green pixel light is represented by point BG', and blue pixel light is represented by point BB'. These points have different polarization states due to dispersion.

The dispersion of the liquid crystal layer can be counteracted using different thicknesses for retarder 178" in pixels of different colors.

Figure 16:
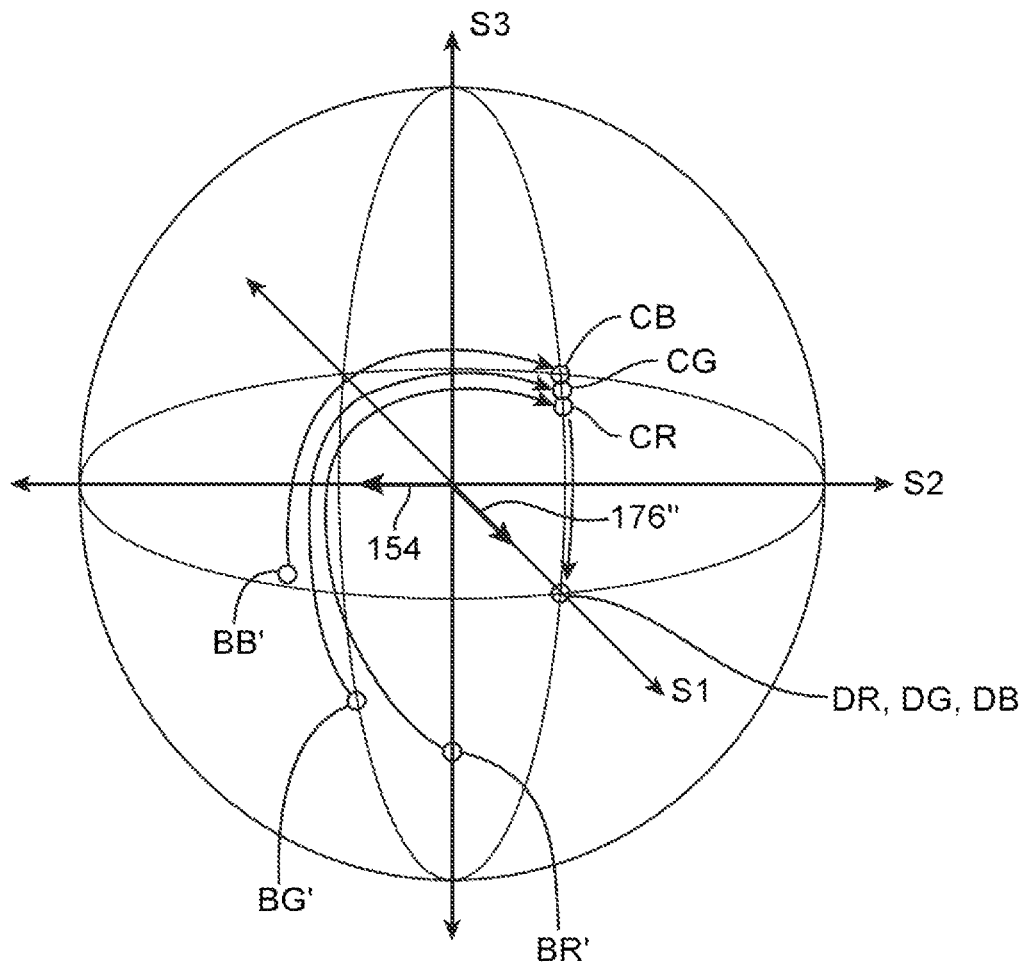
FIG. 16 is a Poincare sphere showing how the polarization of backlight may continue to evolve when passing through the retarder layers and color filter layer of FIG. 14 in accordance with an embodiment of the present invention.

FIG. 16 shows how following passage of light through the retarder layers of different thicknesses (and following rotation about retarder optical axis 176" of FIG. 16), point BR' rotates to the position indicated by point CR, point BG' rotates to the position indicated by point CG, and point BB' rotates to the position indicated by point CB. Different amounts of rotation are associated with display pixels of different colors due to the different thicknesses of the retarder layer in each differently colored display pixel. The resulting polarization states represented by points CR, CG, and CB are the same (i.e., dispersion effects have been compensated). Accordingly, following passage of the light through the color filter elements R, B, and G (which don't affect the polarization states) and passage through color filter layer 56 (and associated rotation about color filter optical axis 154 of FIG. 16), red pixel light has polarization state DR, green pixel light has polarization state DG, and blue pixel light has polarization state DB. The polarization states DR, DG, and DB are equal, indicating that wavelength dependent effects in the birefringence of liquid crystal layer 52 have been removed from display 14.

The table of FIG. 17 shows illustrative thicknesses and properties that may be associated with the structures of FIG. 14. The entries of column I show different display pixel center wavelengths for display 14. The entries of column II show how the liquid crystal thickness in this example is constant across different display pixels. The entries of column III show the wavelength dependence of the birefringence of the liquid crystal layer. The entries of column IV show the value of $\Delta n*d$ of the liquid crystal layer for different pixel colors. The entries of column V show how the retarder thickness varies as a function of pixel color. The entries of column VI show how the birefringence of the retarder material itself may be somewhat wavelength dependent. The entries of column VII show the value of $\Delta n*d$ for the retarder at different pixel colors. Retardation is equal to $2\Pi*\Delta n*d/\lambda$ (where $\lambda$ represents wavelength). The entries of column VIII show the value of $\Delta n*d$ taking into account both retardation in the liquid crystal and in the retarder. Dividing by $\lambda$ to compute a number proportional to retardation (i.e., $\Delta n*d/\lambda$) gives the entries of column IX. The entries of column IX are all equal, demonstrating that the wavelength dependence of the liquid crystal layer birefringence has been counteracted by the wavelength dependence of the retarder and the different respective retarder thicknesses d1, d2, and d3 for differently colored display pixels.

Figure 18:
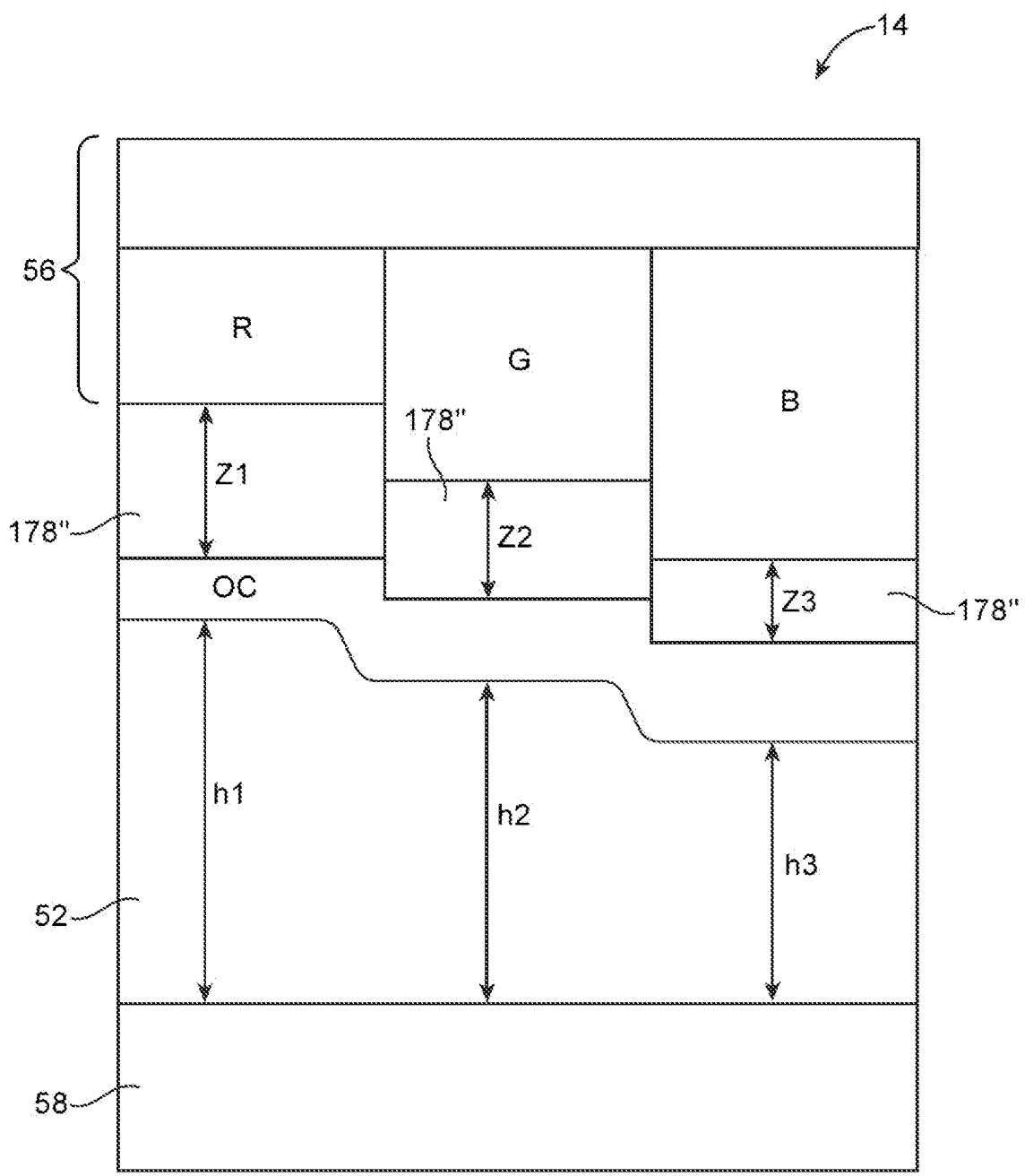
FIG. 18 is a cross-sectional diagram of an illustrative display with different retarder thicknesses and different color filter element thicknesses that result in different respective liquid crystal thicknesses for display pixels of different colors in accordance with an embodiment of the present invention.
Figure 19:
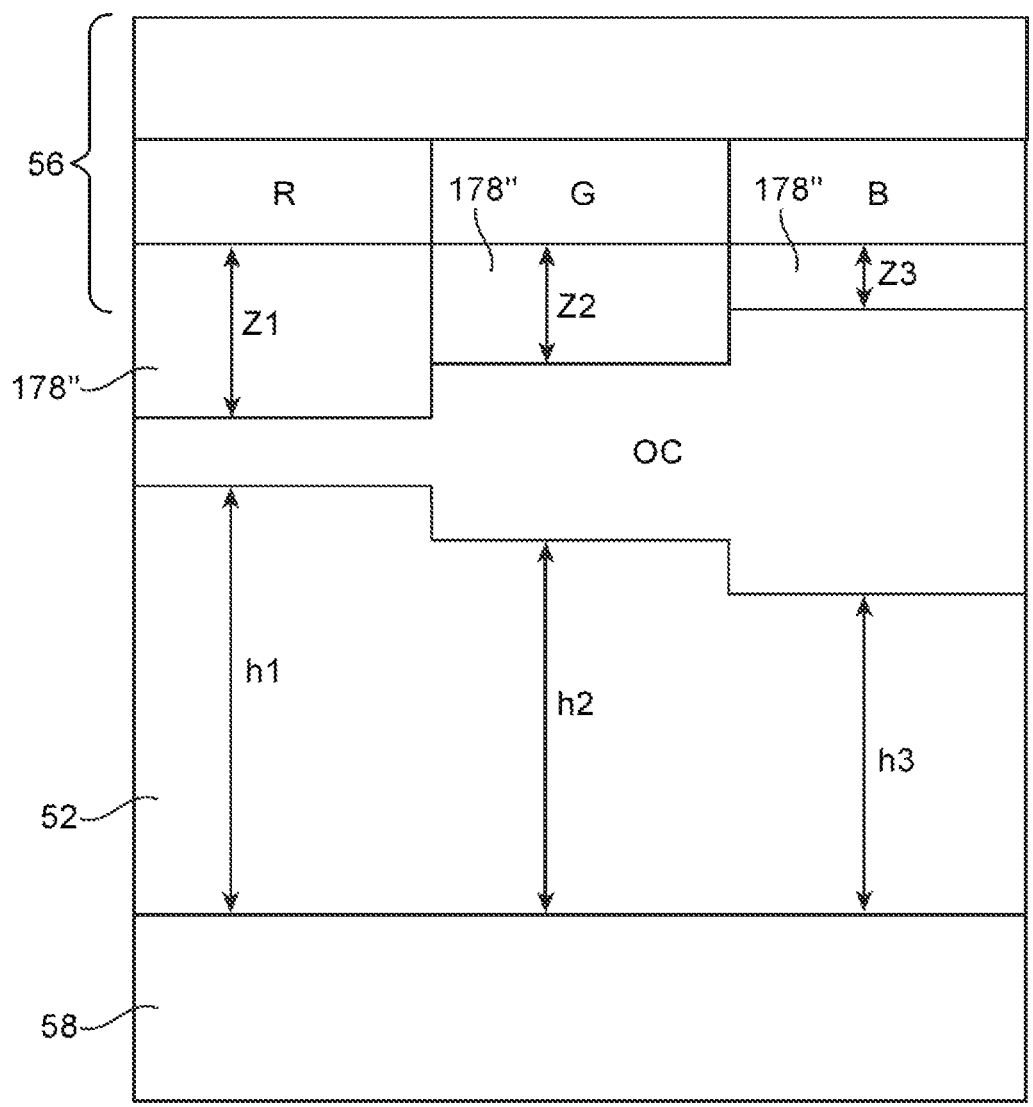
FIG. 19 is a cross-sectional diagram of an illustrative display with different retarder thicknesses that result in different respective liquid crystal thicknesses for display pixels of different colors in accordance with an embodiment of the present invention.

If desired, the liquid crystal layer thickness can be configured to be different for display pixels of different colors, as shown in FIGS. 18 and 19. The different liquid crystal layer thicknesses can help counteract the wavelength dependence of the liquid crystal layer birefringence. In the example of FIG. 18, color filter elements R, G, and B have different thicknesses and retarder structures 178" have different thicknesses (Z1, Z2, and Z3) for different pixel colors, resulting in different liquid crystal layer thicknesses h1, h2, and h3. In the arrangement of FIG. 18, clear non-birefringent polymer overcoat layer OC may lie between layer 178" and layer 52.

In the arrangement of FIG. 19, overcoat OC is interposed between the color filter elements and layer 178". Other configurations for adjusting the retarder thicknesses and/or the thicknesses of the liquid crystal layers in display pixels of different colors may be used, if desired.

FIG. 20 is a table showing how display 14 may be configured to provide liquid crystal layer 52 with different thicknesses. The entries of column II of the table of FIG. 20 show the different liquid crystal layer thicknesses that may be produced for different display pixel colors. The entries of column V show how the retarder thicknesses can be varied to ensure that the entries of column IX do not exhibit any wavelength dependence. In the example of FIG. 21, the maximum variation of retarder thickness that is allowed has been limited (e.g., to facilitate processing). As shown by the entries of column IX in FIG. 21, a small (acceptable) amount light leakage may result in this scenario.

Figure 22:
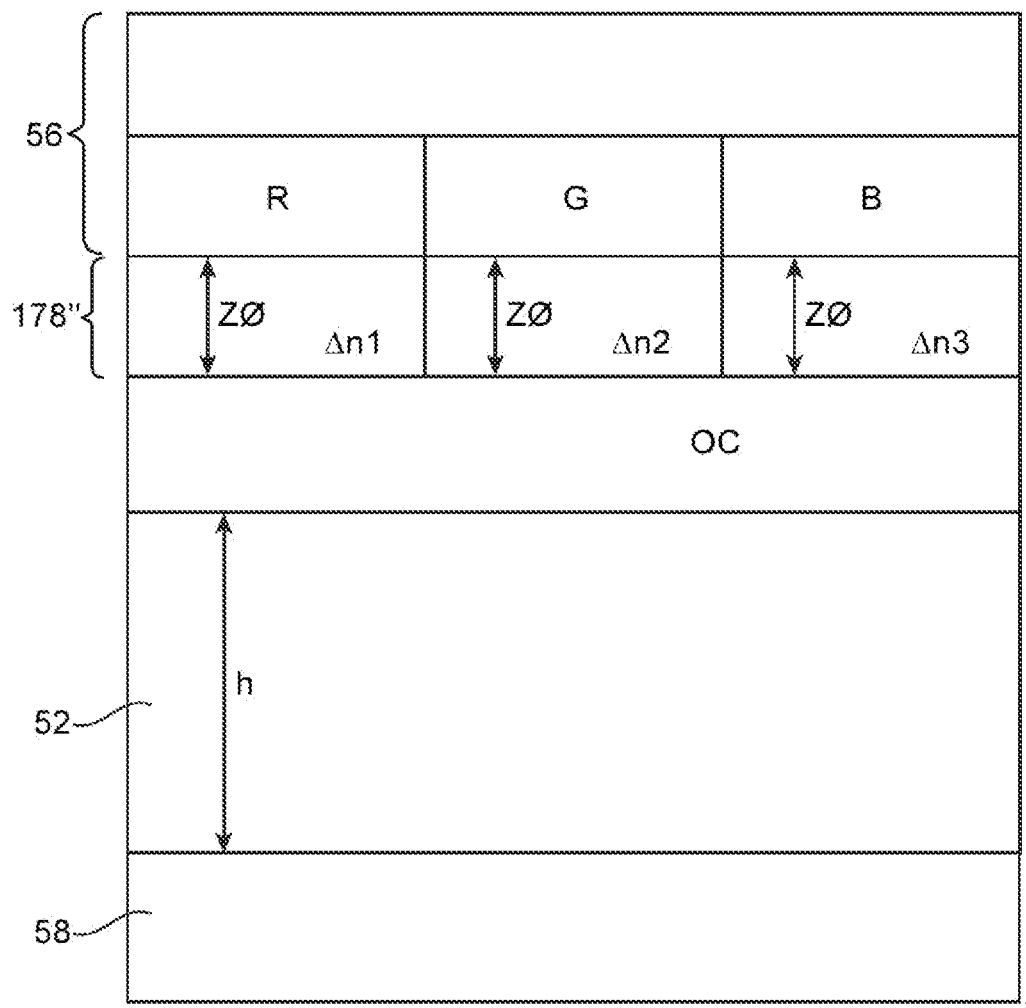
FIG. 22 is a cross-sectional diagram of an illustrative display with different retarder birefringence values for display pixels of different colors in accordance with an embodiment of the present invention.

FIG. 22 is a cross-sectional diagram of an illustrative display with different retarder birefringence values for display pixels of different colors. As shown in FIG. 22, retarder layer 178" may (as an example) have the same thickness Z0 for each pixel color, but may have different birefringence values $\Delta n1$, $\Delta n2$, and $\Delta n3$. Displays may also be formed that have different liquid crystal thicknesses and/or different retarder thicknesses in addition to different birefringence values for different pixel colors.

Figure 23:
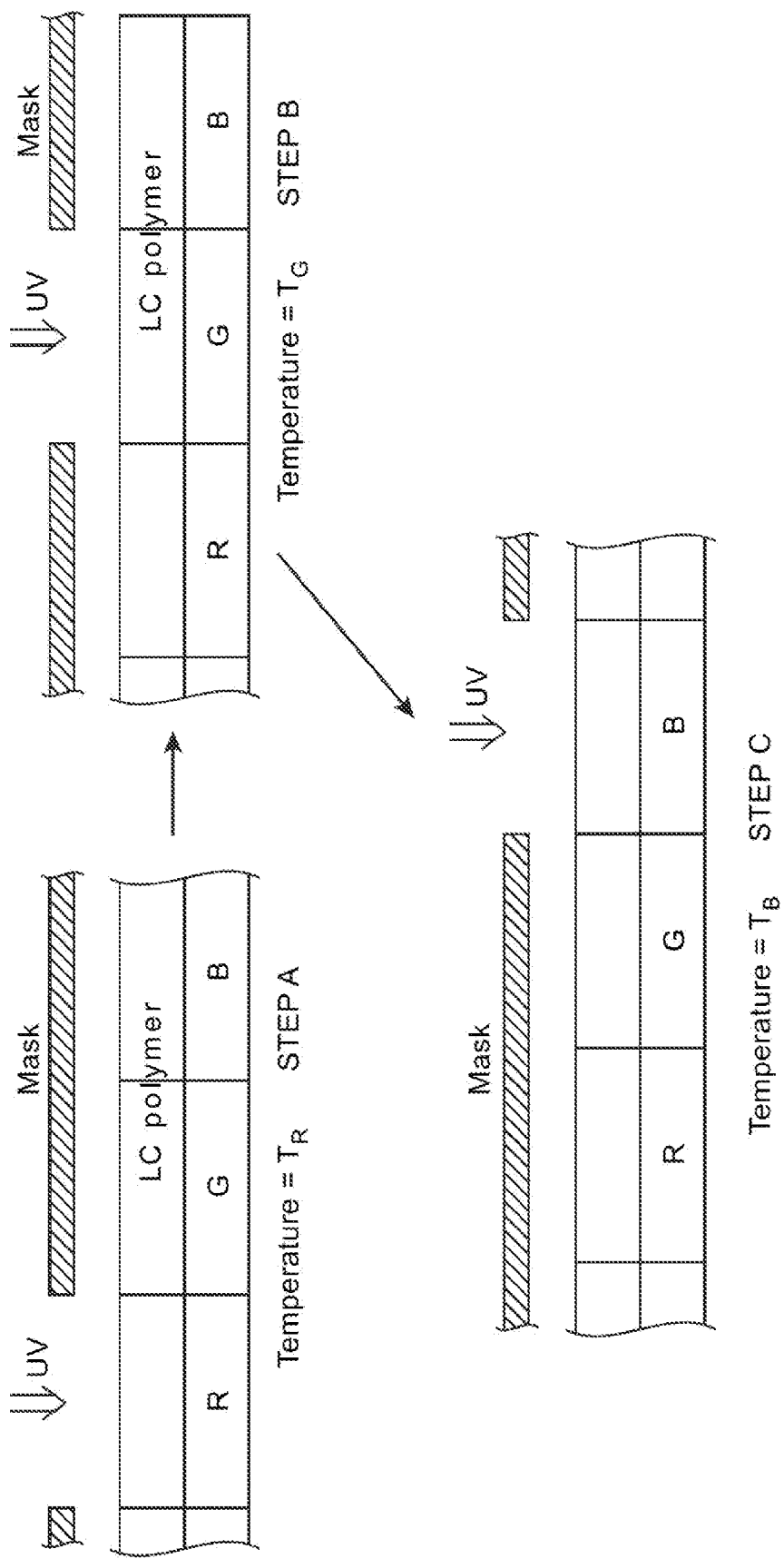
FIG. 23 is a diagram showing how the structures of FIG. 22 may be fabricated by adjusting substrate temperatures during ultraviolet light curing of liquid crystal monomer precursor material to form retarder regions with different birefringence values in accordance with an embodiment of the present invention.

FIG. 23 shows how a structure of the type shown in FIG. 22 may be formed. Retarder layer 178" may be formed by applying ultraviolet light to liquid crystal monomer layer LC. Layer LC may be formed from a liquid precursor material that is polymerized to form retarder layer 178" upon exposure to ultraviolet (UV) light. At higher temperatures, the birefringence of the resulting retarder material will be lower than at lower temperatures.

As shown in FIG. 23, photolithographic masks may be used to expose red pixels to UV light while maintaining the retarder precursor material at a first temperature TR, may be used to expose green pixels to UV light while maintaining the retarder precursor material at a second temperature TG that is different from the first temperature, and may then be used to expose blue pixels to UV light while maintaining the retarder precursor material at a third temperature TB that is different from the first and second temperatures. As an example, TR may be more than TG, which may be more than TB. Larger substrate temperatures tend to reduce the amount of birefringence (i.e., the magnitude of $\Delta n$) in layer 178".

As shown in column VI of FIG. 24, the use of different temperatures during ultraviolet light curing of the retarder precursor material to form retarder layer 178" causes the retarder to exhibit different $\Delta n$ values (birefringence values) for display pixels of different colors. These $\Delta n$ values may be configured to counteract the wavelength dependence of the birefringence of liquid crystal layer 52, as shown in column IX of FIG. 24.

The birefringent retarder layer with different thicknesses for different pixel colors may be located above or below the liquid crystal layer (e.g., when using a uniform liquid crystal layer thickness and/or when using a liquid crystal layer thickness that varies for different display pixel colors and/or when using a constant retarder thickness and/or when using a retarder thickness that varies for different display pixel colors and/or when using a retarder of a constant $\Delta n$ value for different display color pixels and/or when using a retarder with different $\Delta n$ values for different display color pixels). Any of the structures and layouts of the foregoing embodiments (e.g., the order of layers, the thicknesses of the liquid crystal layer, the thicknesses of the retarder, the birefringence values of the retarder, etc.) may be used in combination with the structures and layouts of any other of the foregoing embodiments.

The foregoing is merely illustrative of the principles of this invention and various modifications can be made by those skilled in the art without departing from the scope and spirit of the invention.

What is claimed is:

1. A display having display pixels of different respective display pixel colors, the display comprising:
   an upper polarizer;
   a lower polarizer;
   a liquid crystal layer;
   a first glass layer interposed between the upper polarizer and the liquid crystal layer, wherein the first glass layer comprises a color filter layer having color filter elements of different thicknesses for the different respective display pixel color;
   a second glass layer interposed between the lower polarizer and the liquid crystal layer; and
   a birefringent retarder layer located between the first and second glass layers to help counteract light polarization state changes associated with passing backlight through the liquid crystal layer, wherein the birefringent retarder layer has different thicknesses for different respective display pixel colors, wherein a combined thickness of the color filter element and the birefringement retarder layer is different for each of the respective display pixel colors, and wherein the birefringement retarder layer is interposed between the liquid crystal layer and the second glass layer.

2. The display defined in claim 1 wherein the liquid crystal layer has different thickness for different respective display pixel colors.

3. The display defined in claim 1 wherein the second glass layer comprises a thin-film-transition layer.

4. The display defined in claim 1, wherein the display pixel colors comprise red, green, and blue display peixel colors, and wherein the combined thickness of the color filter element and the birefringent retarder layer for the blue display pixel color is greater than the combined thickness of the color filter layer and the birefringent retarder layer for the red display pixel color and is greater then the combined thickness of the color filter layer and the birefringent retarder layer for the green display pixel color.

5. A display having display pixels of different respective display pixel colors, the display comprising:
   an upper polarized;
   a lower polarizer;
   a liquid crystal layer, wherein the liquid crystal layer has different thicknesses for different respective display pixel color;
   a first glass layer interposed between the upper polarizer and the liquid crystal layer;
   a second glass layer interposed between the lower polarized and the liquid crystal layer;
   a birefringent retarder layer is interposed between the second glass layer and the liquid crystal layer, wherein the biefringement retarder layer has different thicknesses for the different respective display pixel colors, wherein the birefringement retarder layer and the liquid crystal layer are configured to help counteract light polarization state changes associated with passing backlight through the liquid crystal layer; and
   an overcoat layer formed over the birefringement retarder layer, wherein the overcoat layer has different thicknesses for the different respective display pixel colors, correspond to the different thicknesses of the liquid crystal layer.

6. The display defined in claim 5 wherein the first glass layer comprises of a color filter layer and wherein the color filter layer has color filter elements of different thicknesses for different respective display pixel colors.

7. The display defined in claim 5 wherein the second glass layer comprises a thin-film-transistor layer.

8. The display defined in claim 7 wherein the first glass layer comprises a color filter layer and wherein the color filter layer has color filter elements of different thicknesses for different respective display pixel colors.

9. A display having an array of display pixels of different respective display pixel colors, comprising:
   an upper polarizer;
   a lower polarizer
   a liquid crystal layer;
   a first transparent layer interposed between the upper polarized and the liquid crystal layer, wherein the first transparent layer comprises a color filter layer with color filter elements of different colors for the different respective display pixel colors;
   a second transparent layer interposed between the lower polarized and the liquid crystal layer, wherein the second transparent layer compises a thin-film transitor layer; and
   a waveplate layer located between the first and second transparent layers, wherein the waveplate layer has different thicknesses for different respective display pixel colors, and wherein the waveplate layer is interposed between the liquid crystal layer and the thin-film transistor layer.

10. The display defined in claim 9 wherein the liquid crystal layer has different thicknesses for different respective display pixel colors.

11. The method defined in claim 9, wherein an optical axis of the waveplate layer is parallel to an optical axis of the liquid crystal layer.

12. A display having display pixels of different respective display pixel colors, the display comprising:
   a upper polarizer;
   a lower polarizer;
   a liquid crystal layer;
   a first glass layer interposed between the upper polarizer and the liquid crystal layer, wherein the first glass layer comprises a color filter layer with color filter elements of defferent thicknesses for different respective display display pixel colors;
   a second glass layer interposed between the lower polarizer and the liquid crystal layer, wherein the second glass layer comprises a thin-film transistor layer; and
   a birefringent retarder layer located between the first and second glass layers, wherein the birefringent retarder layer has different has different birefringence values for the different respective display pixel colors and is configured to help counteract light polarization state changes associated with passing backlight through the liquid crystal layer, wherein the display emits a different respective color of light for each respective display pixel color, wherein the birefringent retarder layer is configured to counteract the polarization state changes such that polarization states of each of the different respective color of light emitted form the display are the same, and wherein the birefringent retarder layer is interposed between the liquid crystal layer and the second glass layer and has different thicknesses for the different respective display pixel colors.

13. The display defined in claim 12 wherein the liquid crystal layer has different thicknesses for different respective display pixel colors.

* * * * *